United States Patent [19]

Burmeister

[11] Patent Number: 4,715,668
[45] Date of Patent: Dec. 29, 1987

[54] PNEUMATIC MATTRESS TRACK SYSTEM FOR VEHICLES

[76] Inventor: Fredrik K. Burmeister, Lansantorppa 3, SF-02630 Espoo 63, Finland

[21] Appl. No.: 725,791
[22] PCT Filed: Oct. 15, 1984
[86] PCT No.: PCT/FI84/00075
§ 371 Date: Apr. 17, 1985
§ 102(e) Date: Apr. 17, 1985
[87] PCT Pub. No.: WO85/01710
PCT Pub. Date: Apr. 25, 1985

[30] Foreign Application Priority Data
Oct. 19, 1983 [FI] Finland .................. 833810

[51] Int. Cl.⁴ .......................................... B62D 55/26
[52] U.S. Cl. .................. 305/34; 305/35 EB
[58] Field of Search ...................... 305/35 EB, 34

[56] References Cited
U.S. PATENT DOCUMENTS

| | | | |
|---|---|---|---|
| 2,923,578 | 2/1960 | Marsh, Jr. .................. | 305/34 X |
| 3,082,044 | 3/1963 | Klemm et al. .................. | 305/34 X |
| 3,244,458 | 4/1966 | Frost .................. | 305/34 |
| 3,427,078 | 2/1969 | Parsons .................. | 305/34 X |
| 3,495,883 | 2/1970 | Fischbach .................. | 305/34 X |
| 4,530,545 | 7/1985 | Bertelsen .................. | 305/34 X |

FOREIGN PATENT DOCUMENTS

| | | | |
|---|---|---|---|
| 657578 | 9/1951 | United Kingdom .................. | 305/34 |
| 306041 | 8/1971 | U.S.S.R. .................. | 305/34 |

Primary Examiner—David A. Scherbel
Attorney, Agent, or Firm—Ladas & Parry

[57] ABSTRACT

Pneumatic mattress track system to be used as a construction element in vehicles. A soft air filled mattress formed for instance by mattress bags (5) is automatically rolled out and serves as running surface and means of propulsion. The hull (1) of the system is disposed over the mattress on an air cushion (4) and thus without mechanical friction. The mattress formed for instance by the mattress bags (5) is not air tight and filled once, but it is filled automatically when it runs under the system hull (1) and is kept under constant pressure in the carrying position. The air for the mattress is supplied from the air cushion (4) through inlet orifices (7) provided in the wall of the mattress facing the hull (1). The main area of use is transport in difficult and vulnerable terrain.

8 Claims, 21 Drawing Figures

PNEUMATIC MATTRESS TRACK SYSTEM FOR VEHICLES

The invention applies to a pneumatic mattress track system used as a construction element of a vehicle. In the following PMT is used as shortname of such a system. The name "mattress track" is used in this description to denote a soft mattress which rolls out automatically and serves as running surface and a means of applying propulsion force. The term "vehicle" as used herein includes movable or towable machines such as tractors and the like. One vehicle can have several PMTs as construction elements thereof.

For use in difficult terrain there are previously known several band track and mattress track systems, of which as examples may be mentioned the patents SU No. 850482, CA No. 972782 and U.S. Pat. No. 3,074,764 and furthermore the "SATC" system published by W. R. Bertelsen. (Paper for the Seventeenth Canadian Symposium on Air Cushion Technology, Canadian Air Cushion Technology Society, Oct. 4–6, 1983, Ottawa, Ontario: "The Segmented Air Track Amphibious All-purpose All-terrain Vehicle" by William R. Bertelsen, Director of Research, Chairman, Bertelsen, Inc.). With these one has tried to eliminate drawbacks of conventional track systems, amongst which the most serious are damage to the earth surface, sinking down in mud conditions, rolling and pitching when overcoming obstacles and mechanical complexity. For these previously known systems we shall use henceforward the shortnames SU, CA, US and SATC respectively.

In SU the band of a conventional band track system is equipped on the outside with a soft mattress in the form of air-filled bags. CA has a conventional stiff band, but between this and the hull of the vehicle an air cushion is provided. In US there is, instead of the conventional track band, a hollow air filled hose, which functions as mattress, and here also the hull of the vehicle rests on the mattress with the intermediary of an air cushion. To the SATC we shall return in detail later.

According to the present invention there is used an airfilled mattress track instead of the conventional track band and the hull of the vehicle rests thereupon through the intermediary of an air cushion. In this case the mattress is not a tight mattress to be filled once for all, but there are openings in that part of the mattress wall that faces the hull, and through these openings the mattress is automatically filled with air from the air cushion. Because the aforementioned hull-facing wall of the mattress has in this description and the patent claims a central and repeated importance, it has been considered best to use the special name "band" for it, although it does not in all cases in every respect correspond to the conventional definition of a band.

A mattress filled with air according to the present invention adjusts itself better to the terrain than the stiff band of CA and also better than the once for all filled tight mattress of SU and US. This statement is true because the pressure does not rise inside where the mattress gives way for an obstacle. This leads to reduced rolling and pitching when overcoming obstacles.

Because of the good selfadjusting and the even pressure distribution, the risk of earth damage is less than with CA, SU and US. This is a highly important quality in many marshlike terrain conditions.

It should be observed that the advantages of the invention in comparison with SU and US are obtained without marked increase of air consumption and component cost, because the air cushion in itself is the main air consumer.

In comparison to SU and US, also harm from possible mattress leakage is eliminated by the invention. Therefore the mattresses can be made of thin material, avoiding deformation problems at the wheels and in addition weight and material savings are achieved. It is possible to build large systems which equal the biggest air cushion vessels in size. Joints between mattress parts can be made by simple riveting methods and absolute air tightness is not necessary.

When the track mattress is divided into separate bags, then the obstacle-overcoming capability can be taken as equal to the thickness of the mattress in height. Thus considerable obstacle-overriding capability is achievable.

Good amphibious capability can be achieved because large buoyancy volume can be built using thin material.

Now we shall still make a comparison PMT-SATC. SATC also has a sort of a pneumatic air mattress. It is formed by a skirt system, which is, so to say, turned inside out, that is, it is closed outward and open inward. The open border of the skirt is equipped with a chain and runs about cog wheels mounted at the forward and aft ends of the system. The hull resting on the wheel axles obtains thereby its support. The inner edge of the skirt moves also against a side wall and thus a closed interior space is formed whose overpressure acting against the roof supports the hull system.

In comparison with the SATC system the PMT has the following advantages, e.g.:

The working weight of the PMT moves against the mattress with air lubrication; the SATC supporting in comparison embodies mechanical friction causing energy loss and wear.

The special supporting principle of the SATC causes obviously much bigger forces and strains to the band and the axles than in the PMT system.

The SATC has obviously a much longer air leakage gap than the corresponding PMT.

When the vehicle encounters an obstacle, e.g. an ice wall, then SATC has, in the contact point of the air mattress, full inside pressure. With the PMT full pressure develops only when the obstacle has come under the hull. The obstacle crossing resistance of the PMT is therefore considerably smaller.

The fore-aft weight distribution is less critical with PMT than with SATC, because in the PMT the inside pressure rises at low sinking points.

The special supporting principle of the SATC makes the vehicle's height considerably bigger than is necessary with the corresponding PMT.

The PMT is mechanically simpler and less apt to corrosion than SATC with its intermediate wheels and chains.

In the accompanying drawings, exemplary embodiments of the invention are described in detail.

| | |
|---|---|
| FIG. 1 Bag type | PMT, longitudinal section A-A. |
| FIG. 2 Bag type | PMT, cross section B-B. |
| FIG. 3 Hose type | PMT, longitudinal section A-A. |
| FIG. 4 Hose type | PMT, cross section B-B. |
| FIG. 5 Hose type | PMT, horizontal section C-C. |
| FIG. 6 Concave bottom | PMT, longitudinal section A-A. |
| FIG. 7 Concave bottom | PMT, cross section B-B. |

In the embodiment examples we have two main types, the bag type where the mattress is formed from separate bags, and the hose type where the mattress is in the form of an endless tubelike hose.

Figure 1:
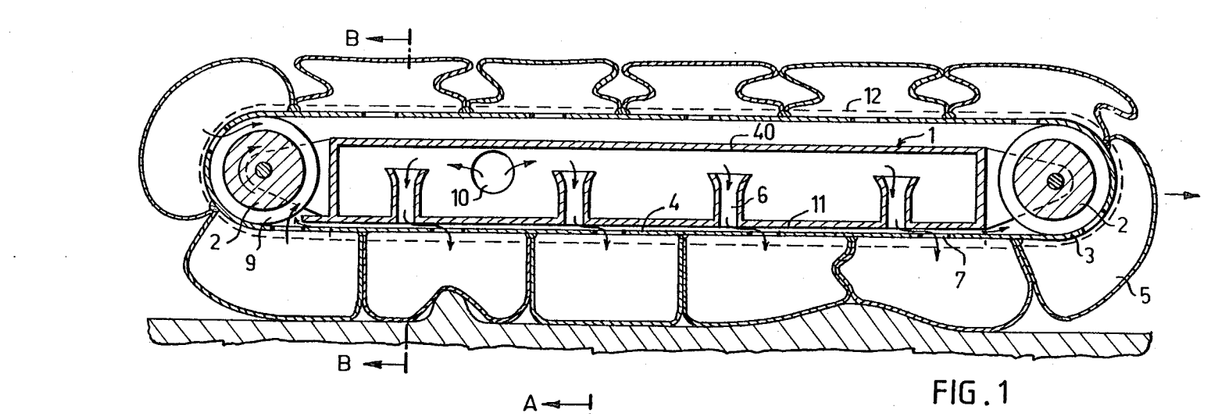
Figure 2:
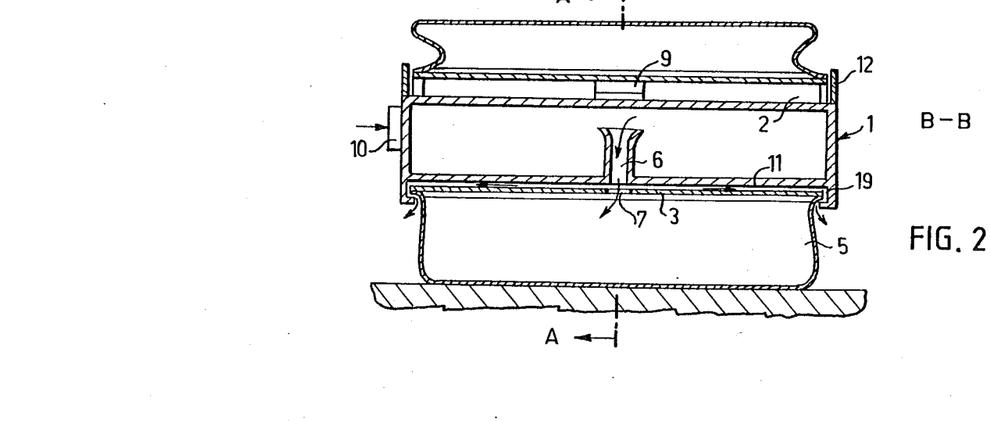

FIG. 1 and FIG. 2 show examples of the bag type. Air is fed through the orifice (10) to the inner space of the hull (1), from where, through outlets (6) in the bottom (11), it flows into the air cushion space (4) which is formed between the bottom (11) and the band (3) which forms the inner wall of the mattress bags (5). The whole weight of the vehicle rests thus through the intermediary of the air cushion upon the track mattress, and thus "air lubrication" develops between the hull and mattress. From the air cushion air can pass through the orifices (7) in the band (3) and fill the mattress bags (5), whereby the hull is lifted from the ground. Spilling air passes continuously through the gaps between the band and the guiding surfaces (19) and at the ends of the hull. The rollers (2) or one of them pull at the band (3), causing the hull (1) to glide forward. The motion resistance is small due to the air lubrication. When the bags (5), one after another, come out from under the bottom, then the air feed to them ceases, and as they come up on the roller (2) they are partly compressed. In order that this might not cause resistance, an escape path is provided for the bag air through the orifices (7) and a groove (9) in the roller (2). The orifices (7) and the groove (9) are for this purpose arranged in the same line. The roller (2) can consist of several coaxial wheels and then the wheel interspaces can serve as the grooves (9). If the bags (5) could not discharge freely when circling the roller (2), then the ensuing overpressure might cause extra strain and increase of motion resistance.

When the bags (5) have circled also the fore roller (2), then they move eventually again under the bottom (11) and are filled again. When moving on the upper return path they could discharge more than desirable under the influence of their own weight. In the embodiment example one has, in order to prevent this, closed with side plates (12) the interspaces between band (3) and hull (1) receiving air discharging from the grooves (9) and also from the air cushion space (4) leaking under the end plates of the hull. Although the said spaces are not absolutely air tight, there develops in them so much counterpressure that the bags (5) do not discharge too much.

Figure 3:
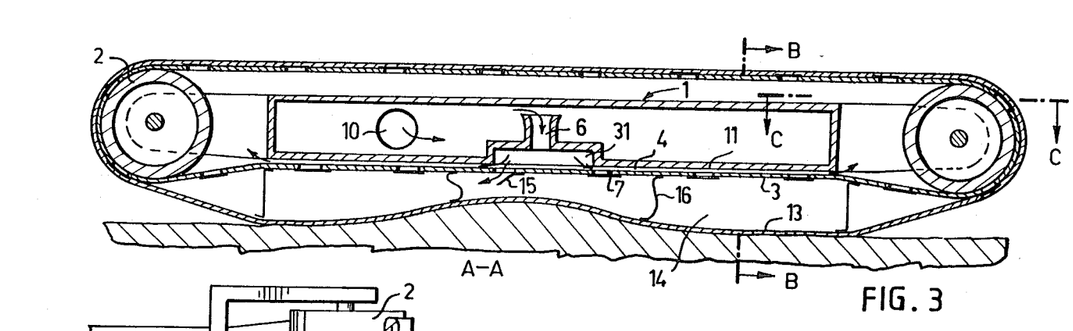
Figure 4:
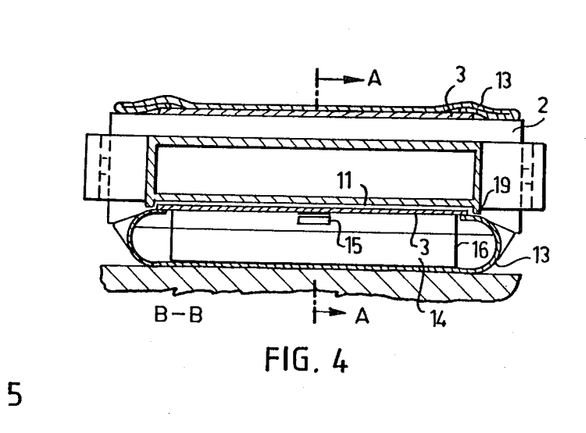
Figure 5:
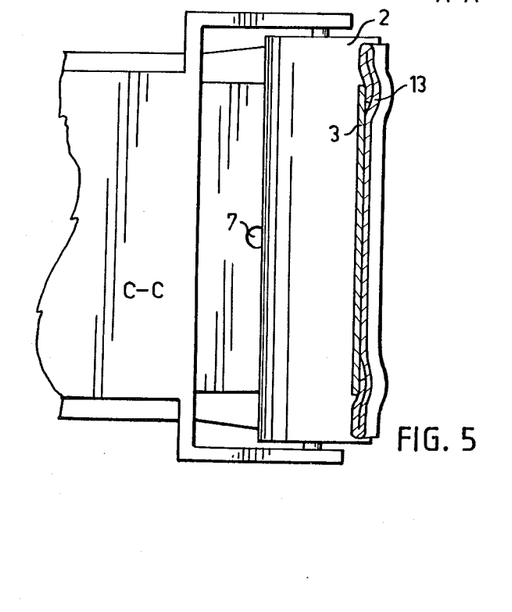

FIG. 3, FIG. 4 and FIG. 5 present an embodiment example of the hose type. The hose is here built up so that, on the outside of the band (3), there has been fastened at the edges another band (13), creating thus between the two bands a continuous endless hollow space (14). Through an orifice (6) in the bottom of the hull, pressurized air is blown into the air cushion space (4), from where it continues through the orifices (7) and fill the mattress space (14). All of the space (14) is not filled, only the ground side. This is so because the bands (3) and (13) are pressed together at the rollers. In this embodiment example one wishes to prevent air from discharging through the orifices (7), when these come out from under the bottom (11). This is achieved using one way flaps (15). It should be noted that, although the hose is compressed when coming upon the roller (2), this does not necessitate air discharge at this point, because the hose simultaneously opens at the other end of the system. Thus the air of the mattress keeps stationary with respect to the hull of the vehicle, but moves forward with respect to the band. In this embodiment example cross walls (16) are used inside the hose in order to stiffen it with regard to sideward forces.

Figure 6:
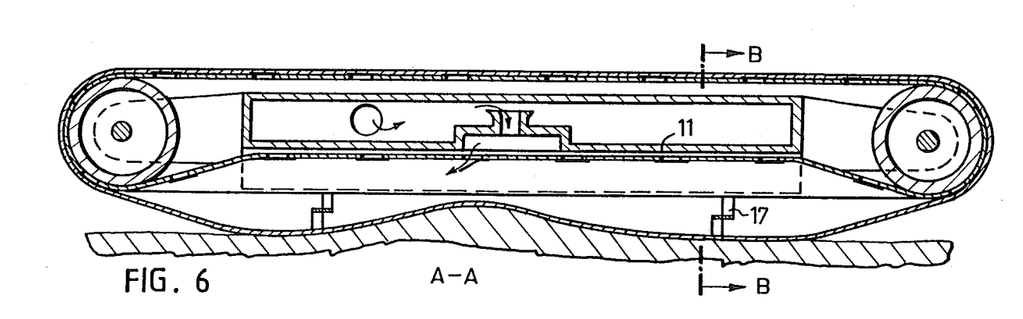
Figure 7:
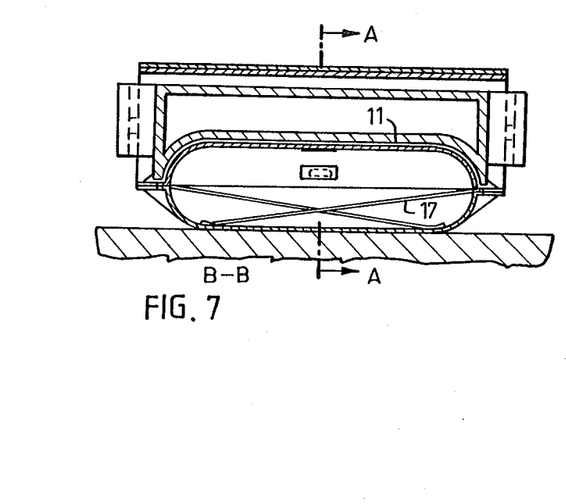

FIG. 6 and FIG. 7 show a hose type embodiment, where the bottom of the hull has been made concave with the aim to support the mattress against sideward forces. This example has the additional feature of using diagonal bands (17) inside the hose to stiffen the hose against sideward forces.

Figure 8:
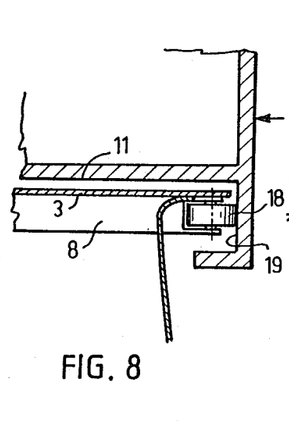
FIG. 8 Side support of mattress with wheels or glide shoes, using stiffeners in the band to take up pushing force.

FIG. 8 shows an embodiment of hose or bag type, where the inside wall (3) of the mattress is equipped with cross stiffeners (8) and the outside ends of these with wheels or glide shoes which bear against outside guides (19), giving thus sidewards support to the mattress (5) or (14). In the event of side forces, the stiffener is subjected to compression force.

Figure 9:
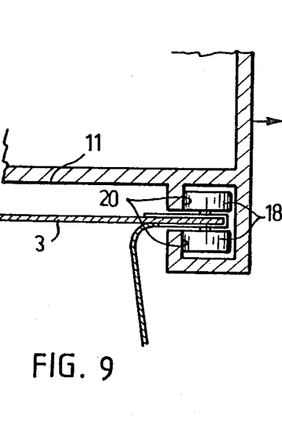
FIG. 9 Side support of mattress with wheels or glide shoes, using only tensile force in the wallband of the mattress.

FIG. 9 also shows an embodiment of either hose or bag type, having also wheels or glide shoes (18) to give sideways support, but in this case they bear against inside guides (20). Here a side force causes only tension and no compression force to the band (3), and so no stiffener is needed.

Figure 10:
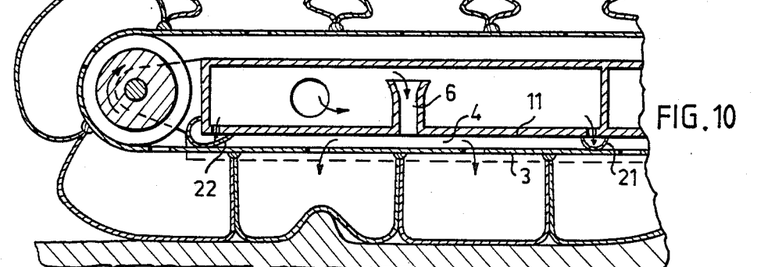
FIG. 10 Use of rather thick air cushion in PMT.

FIG. 10 shows use of a rather thick air cushion (4) and tightness and stability problems emanating therefrom. With a thick air cushion, one more easily avoids the band (3) chafing against the bottom (11). A further advantage is that the air feed to the air cushion space is simple and only one orifice (6) may be sufficient, because the feeding air gets freely to all feeding orifices of the mattress. However, a thick air cushion needs, in order to avoid air spill, efficient sealing at the ends of the hull bottom, and for this purpose the Figure shows as an example a bag type seal (22) which must in some way be fed with an air pressure greater than that of the air cushion (4). A thick air cushion weakens the longitudinal stability, i.e. the cushion is easily depressed to a thinner state at one end than the other. In order to improve longitudinal stability, this embodiment uses partition of the cushion space with transverse seals (21). If need arises the different compartments could be fed from separate sources.

Figure 11:
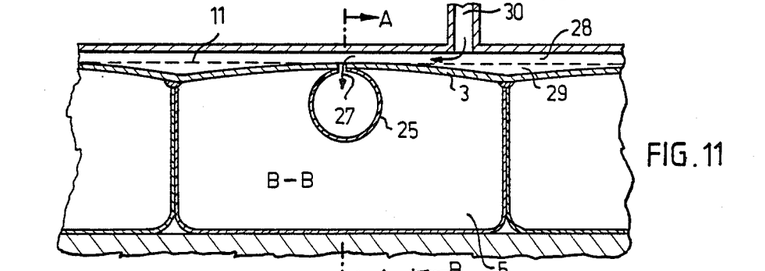
FIG. 11 System of air lubrication using feeding channel inside the mattress, longitudinal section B—B.
Figure 12:
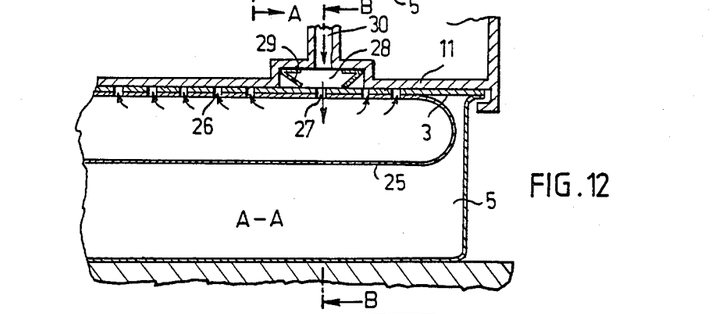
FIG. 12 Cross section of FIG. 11A—A.

FIG. 11 and FIG. 12 show, for a bag type mattress, use of a rather thin air cushion (4) and consequent smoothness problems of the air supply. A thin air cushion is favorable from the viewpoint of stability and space requirement. However, it increases risk of mechanical chafing between band (3) and hull bottom (11) and special measures must be taken to avoid chafing. Choosing sufficient division for the orifices (6) one obtains efficient air lubrication for the whole area of the bottom (11). In this embodiment example the air lubrication has been enhanced especially at such points where risk of chafing is severest, i.e. along the transverse midlines of the bags. Simultaneously with this other conventional air cushion feed may be used. Both systems could in case of need be fed from different air sources.

Figure 13:
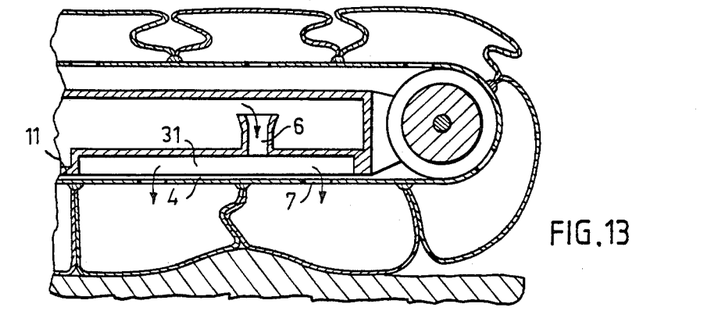
FIG. 13 System of air feed to cushion space using longitudinal grooves in bottom of the hull.

FIG. 13 shows a bag type embodiment example, where one has tried to speed up air filling of the bags and simultaneously reduce pressure losses at the moment when the bags after the return path again come under the bottom. In this way one obtains continuous direct feed from the orifices (6) to the mattress bags (5), so to say bypassing the air cushion proper. With the bag type, this arrangement requires that in the longitudinal direction the groove stretches over the complete bottom area, either continuously or as several successive parts, so that each part's length must be at least equal to the division of the orifices (7). With the hose type, on the contrary, only one part in the middle may be sufficient. In both types the groove part has to be at least equal in length to the division of the orifices (7). The aforedescribed arrangement is especially useful whenever the air cushion is thin. Whenever the air cushion is thick, then the air feed is rather efficient without special arrangements.

Figure 14:
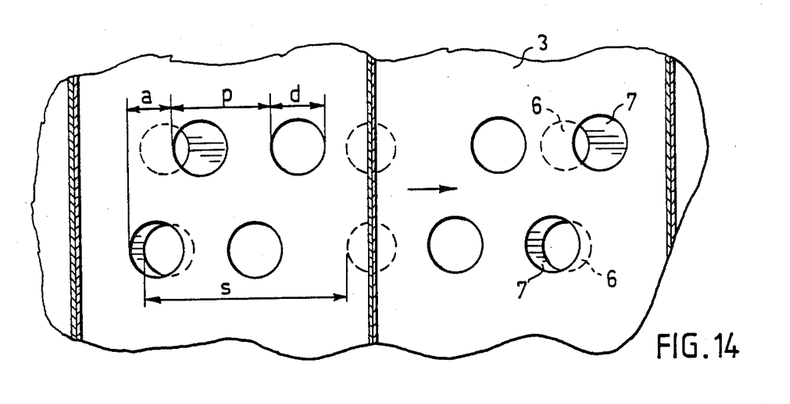
FIG. 14 Mutual placement of feeding openings to cushion and mattress space.

FIG. 14 shows a method of arrangement and dimensioning of orifices (6) and mattress openings (7), which has empirically been found effective from the viewpoint of quick filling of the bags. Both the orifices (6) and mattress openings (7) are arranged in pairwise lines so that both mattress opening lines have a mutual phase difference distance a, but the orifices (6) do not have any mutual phase difference. The diameter of bag openings (7) is d. Dimensions shall be chosen so that the mattress opening (7) division p is at the most a+d
the orifice (6) division s is at the most 2(a+d).

For every bag there are in both lines two openings (7). Of course several paired queues can be arranged in parallel.

Figure 15:
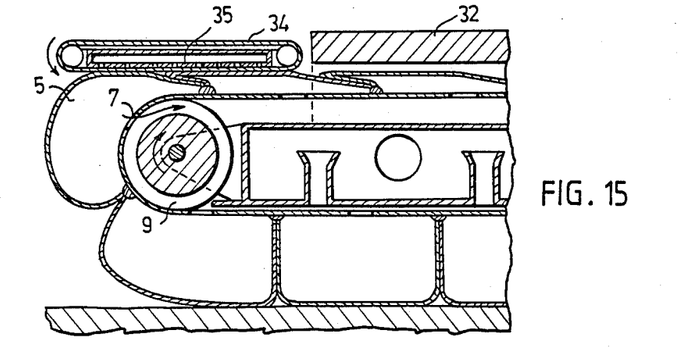
FIG. 15 Emptying arrangement for mattress bags by compression.

FIG. 15 shows an example of a mattress bag emptying device, which can be used, with a space saving view, whenever one wishes for instance to install a cargo deck over the mattress track system. The device has a free running track band (34) and a support plate (35) for the band. Between the plate (35) and the band one may for instance install an air cushion for "lubrication". With this forced emptying, the bags are discharged more than normal, but this entails of course increased air consumption.

Figure 16:
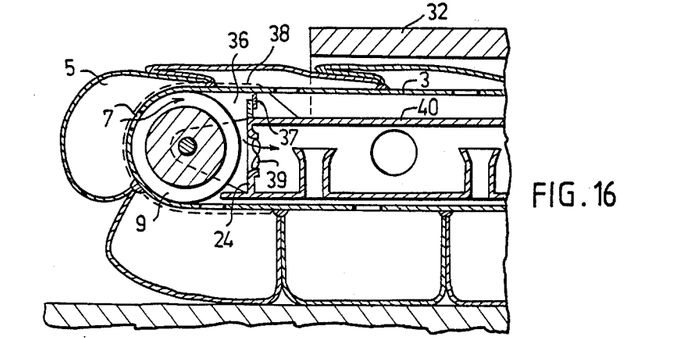
FIG. 16 Emptying arrangement for mattress bags by suction.

FIG. 16 shows another example of forced bag emptying, whenever such is needed. Here the bags are emptied by sucking air with a fan (39) from the space (36) between the roller (2) and the hull end (24). For this purpose one must close the space (36) with plates (38) and the seal (37). It should be noted that in this arrangement the forced emptying of the bags (5) does not imply air waste, because the sucked air is used again.

Figure 17:
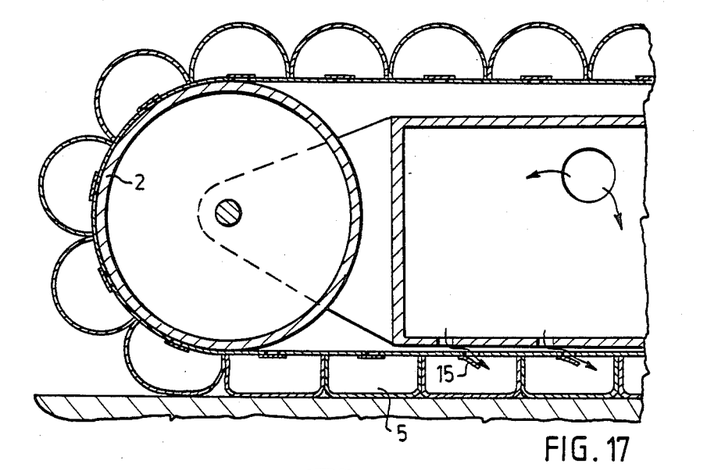
FIG. 17 One way flaps for the mattress bags to prevent emptying.

FIG. 17 shows an embodiment example, where a roller (2) diameter, big in relation to the mattress bag (5) size, was chosen. In this case the volume of the bags does not decrease much when they circle the roller and no discharge possibility is needed. In this case one can therefore use one-way flaps, as earlier described with FIGS. 3–5 in connection with the hose type.

Figures 18, 19, 20:
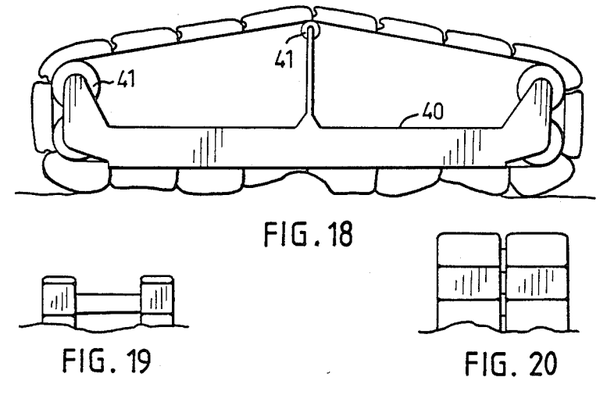
FIG. 18 Lifting of return path of mattress with auxiliary rollers.
FIG. 19 Two PMTs mutually joined by interconnecting hull.
FIG. 20 Two PMTs mutually joined without interconnecting hull.

FIG. 18 shows an embodiment example, where one has wished to place cargo on a hull deck (40) of the mattress track system. This can be arranged by heightening the return path of the mattress using auxiliary rollers (41). Another method is to use rollers (2) of large size.

FIG. 19 shows schematically an example of the use of two PMTs as construction elements in a vehicle. They have here been used in parallel, interconnected by an intermediate hull. Steering is achieved by driving both units at differing speeds. This, as is the case with the following examples, is only an application of the established practice in band and chain track systems.

FIG. 20 shows an example where two PMTs have been connected directly to each other without an intermediate hull. This implies that the payload spaces are placed either above the return path of the mattress as in FIGS. 15 and 16 or between the forward leading and the return paths as in FIG. 18. In these schematic examples details such as arrangements for the driver's view have been omitted.

Figure 21:
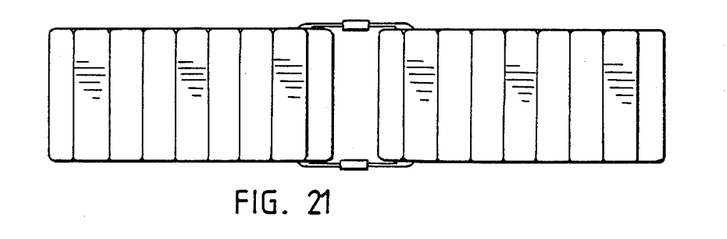
FIG. 21 Two PMTs connected in tandem.

FIG. 21 shows the use of two PMTs in tandem. Steering is here realized by articulation i.e. the mutual direction of the two units is regulated by their coupling. Here also the payload spaces have to be situated either above the return path of the mattress or between the forward leading path and the return path of the mattress. This embodiment comes into question when a very low ground pressure is needed and at the same time the track width is limited.

The various embodiments of the invention are of course not restricted to the above shown examples, but they can vary broadly within the scope of the claims. Some further variations and embodiments are briefly described below.

The longitudinal stability of the bag type PMT may be increased considerably by dividing the orifices (6) into two groups so that the fore and aft orifices are fed from different air-sources. On the other hand this gives rise to the drawback of increased pitching movements during obstacle crossings.

Water may come into the mattress. For this reason it is advisable to equip the mattress bottom with water outlets. This will not give rise to any noteworthy air loss.

In order that band (3) always will stay sufficiently tight the axle of one of the rollers (2) should be either adjustable or its supports feathered in the direction of vehicle motion. It might be worthwhile to equip the rollers (2) with side edges and teeth and the band (3) with corresponding teeth in order to protect the band against side forces.

In order to increase the propulsion capability in difficult conditions the outside of the mattress may be equipped with grousers (projections).

If it is feared that, despite other precautions, there might develop mechanical friction between the bottom (11) of the hull and the mattress, the probable contact area may be decreased by a corrugation of the bottom surface or by corresponding means.

In the exemplary embodiments the inside of the hull has been shown as an air distribution space. Another way is to connect the orifices (6) to an air distribution piping.

The mattress may be divided into bags (5) not only longitudinally but also transversely and the different parallel arrays of bags may be arranged out of phase with each other in order to give a smoother ride.

When the air cushion is used, the air lubrication between the hull bottom and the mattress may be effected by other means than the method earlier described in connection with FIGS. 11-12. By using a permeable material in band (3) instead of discrete inlet orifices (7), the maintenance of the air cushion is effected, because then there cannot develop locally an underpressure within the cushion in relation to the inner space of bag (5) which, underpressure, might lead to a partial collapse of the air cushion locally. Moreover a direct feeding from orifices (6) to bags (5) is achieved without the intermediary of the air cushion. The same purpose may be achieved by elongating in the direction of motion the inlet orifices (7) of the mattress even up to the length of bags (5). The orifices (6) must then be situated in line with the inlet orifices (7) and the spacing of orifices (6) must not be chosen larger than the length of bags (5).

The embodiment of FIG. 19, where two PMTs have been connected by an intermediate hull, can be complemented by adding air cushions under the intermediate hull to carry part of the vehicle weight. To do this, ordinary air cushion skirts should be applied in order to close the fore and aft ends of this air cushion. Such means are previously known as suggestions and also as a prototype realization in chain- and band track systems. In these, however, the air cushion also has to be equipped also with side skirts. With the mattress track system of this invention the side skirts are not necessary, because the mattresses closes the air cushion from the sides. Such a solution is thus especially attractive in connection with mattress track systems.

I claim:

1. A pneumatic mattress track system used as a construction element of a vehicle, comprising a hull, front and rear roller means, endless, hollow mattress means running around said roller means, said mattress means having a plurality of discrete bag arrangements, each bag arrangement having a band surface facing the hull during entire operation of the system, the band surface having at least one opening for feeding a pressurized gas into the bag arrangement, a gas cushion space being defined between the hull and the band surfaces of the plurality of bag arrangements, the gas cushion space having a substantially thin configuration to enable to use a bottom of the hull and the band surfaces as the only sealing means for the gas cushion space, the gas being fed into the gas cushion space through a plurality of orifices in the bottom of the hull, a number of the orifices being at least equal to a number of the bag arrangements upon which the system rests during the operation.

2. A system according to claim 1 wherein the orifices in the hull and the openings in the band surfaces are situated along substantially the same line extending in the direction of movement of said mattress means.

3. A system according to claim 1 wherein one way flaps are situated in the orifices in order to stop air from leaving the mattress.

4. A system according to claim 1 wherein the band surfaces are equipped with transverse stiffeners the ends of which are equipped with glide shoes leaning against outside guides to give sideward support to the mattress means.

5. A system according to claim 1 wherein glide shoes are situated along the edges of the band surfaces, the glide shoes leaning against inside guides giving sideward support to the mattress means through tensile forces set up in the band surfaces.

6. A system according to claim 1 wherein longitudinal grooves with gas supply pipes and seals against the band surfaces are made in the bottom of the hull, in each bag arrangement there is fastened transversally to the band surface a tubelike bag, wherein a common fastening strip of the tubelike bag and the band surfaces are equipped with holes in such a way that one hole is in line with groove functioning as gas inlet orifice of the tubular bag, and other holes feed gas further on from the tubular bag to the gas cushion space, for securing the gas lubrication in critical parts between the band surfaces and the hull bottom.

7. A system according to claim 1 wherein the direction of motion in the bottom of the hull, grooves are provided, for receiving the gas through orifices, and in which the inlet orifices of the mattress means are arranged in rows conforming to the grooves for filling of the mattress means.

8. A system according to claim 1 wherein a space between the rear roller means and an end wall of hull is closed by side plates and made tight by a seal between a hull cover and band and wherein the gas is drawn from the space by fan means, emptying the bags arrangement to save a space.

* * * * *